US010322606B2

(12) United States Patent
Tang

(10) Patent No.: US 10,322,606 B2
(45) Date of Patent: Jun. 18, 2019

(54) WHEEL MECHANISM

(71) Applicant: OMNIMUS COMPANY (HK) LIMITED, Kwai Chung, New Territories (HK)

(72) Inventor: Wai Kwon Tang, Sai Kung (HK)

(73) Assignee: OMNIMUS COMPANY (HK) LIMITED (HK)

( * ) Notice: Subject to any disclaimer, the term of this patent is extended or adjusted under 35 U.S.C. 154(b) by 0 days.

(21) Appl. No.: 16/067,226

(22) PCT Filed: Dec. 14, 2016

(86) PCT No.: PCT/CN2016/109809
§ 371 (c)(1),
(2) Date: Jun. 29, 2018

(87) PCT Pub. No.: WO2017/128879
PCT Pub. Date: Aug. 3, 2017

(65) Prior Publication Data
US 2019/0039412 A1    Feb. 7, 2019

(30) Foreign Application Priority Data
Jan. 27, 2016  (HK) .................. 16100883.2

(51) Int. Cl.
*B60B 33/00*    (2006.01)
(52) U.S. Cl.
CPC .......... *B60B 33/0036* (2013.01); *B60B 33/00* (2013.01); *B60B 33/0042* (2013.01);
(Continued)

(58) Field of Classification Search
CPC . Y10T 16/184; Y10T 16/212; Y10T 16/1857; Y10T 16/186; Y10T 16/1867;
(Continued)

(56) References Cited

U.S. PATENT DOCUMENTS

| 523,801 A   | * | 7/1894 | Vegiard | B60B 33/0028 16/45 |
| 1,428,899 A | * | 9/1922 | Nixon   | B60B 33/0028 16/18 B |

(Continued)

FOREIGN PATENT DOCUMENTS

| CN | 203623280 U | 6/2014 |
| CN | 204398750 U | 6/2015 |

OTHER PUBLICATIONS

International Search Report (ISA/CN), PCT/CN2016/109809, dated Mar. 3, 2017, 4 pages.

*Primary Examiner* — Chuck Y Mah
(74) *Attorney, Agent, or Firm* — Ware, Fressola, Maguire & Barber LLP

(57) ABSTRACT

A wheel mechanism (10) is disclosed as including an outer wheel (12), two inner wheels (36) received in the outer wheel, and two rubber dampers (24) each separating a respective outer wheel and inner wheel, the rubber dampers being deformable between a first configuration in which the entire outer periphery (37) of the inner wheel is in contact with an inner wall (29) of a recess (28) of the rubber damper and a second configuration in which a part of the outer periphery of the inner wheel is out of contact with the inner wall of the recess of the rubber damper.

17 Claims, 3 Drawing Sheets

(52) U.S. Cl.
CPC ..... *B60B 2200/20* (2013.01); *B60B 2200/242* (2013.01); *B60B 2200/43* (2013.01); *B60B 2200/45* (2013.01); *B60B 2360/104* (2013.01); *B60B 2360/106* (2013.01); *B60B 2360/32* (2013.01); *B60B 2360/50* (2013.01); *B60B 2900/131* (2013.01); *B60B 2900/133* (2013.01)

(58) Field of Classification Search
CPC ......... Y10T 16/196; B60B 9/06; B60B 9/005; B60B 2900/1331; B60B 33/036; B60B 33/0042; B60B 2200/20; B60B 2200/242; B60B 2200/43; B60B 2200/45; B60B 2360/104; B60B 2360/106; B60B 2360/32; B60B 2360/50; B60B 2900/131; B60B 2900/133; B60B 33/002; B60B 33/00; B60B 33/0028; B60B 33/0039; B60B 33/0047; B60B 33/0057; B60B 33/045; B60B 33/0063; B60G 11/00; B60G 11/14; B60G 11/15; B60G 11/16; B60G 11/006; B60G 3/01; A45C 5/14; A45C 2005/148
See application file for complete search history.

(56) References Cited

U.S. PATENT DOCUMENTS

| | | | | |
|---|---|---|---|---|
| 1,734,326 A * | 11/1929 | Chesnutt | ............. | B60B 33/0028 152/212 |
| 1,855,316 A * | 4/1932 | Schacht | ............. | B60B 33/0028 16/45 |
| 1,887,436 A * | 11/1932 | Schacht | ............. | B60B 33/0028 16/45 |
| 2,272,270 A * | 2/1942 | Krotz | ................... | B60B 33/045 16/44 |
| 2,443,900 A * | 6/1948 | Evans | ................... | B60G 11/15 16/44 |
| 2,669,448 A * | 2/1954 | Cushman | ................. | B60B 9/10 152/44 |
| 2,670,242 A * | 2/1954 | Beckman | ............... | A63C 17/22 301/5.7 |
| 3,183,544 A * | 5/1965 | Bailey | ....................... | B60B 9/02 152/5 |
| 3,194,293 A * | 7/1965 | Kindley | .............. | B60B 33/0028 152/327 |
| 3,807,817 A * | 4/1974 | Black | ................. | B60B 33/0028 16/45 |
| 4,072,373 A * | 2/1978 | Black | ................. | B60B 33/0028 301/5.7 |
| 4,294,491 A * | 10/1981 | Black | ..................... | B60B 3/082 301/105.1 |
| 5,394,589 A | 3/1995 | Braeger et al. | | |
| 5,493,755 A * | 2/1996 | Kindstrand | .......... | B60B 33/045 16/44 |
| 5,560,685 A * | 10/1996 | De Bortoli | ......... | A63C 17/1454 152/50 |
| 5,733,015 A * | 3/1998 | Demarest | ............... | A63C 17/24 152/312 |
| 5,875,518 A * | 3/1999 | Walker | ................ | B60B 33/0028 15/46 |
| 6,880,203 B1 * | 4/2005 | Aubin | ................. | B60B 33/0028 16/31 R |
| 7,284,299 B2 * | 10/2007 | Ruckman | .............. | B60B 33/001 16/18 R |
| 8,061,697 B1 * | 11/2011 | Lee | ........................ | B60G 11/14 188/290 |
| 8,850,658 B2 * | 10/2014 | Dayt | ...................... | B60B 1/006 16/31 R |
| 2004/0006844 A1 * | 1/2004 | Modlhammer | .......... | B60B 9/00 16/18 R |
| 2012/0017391 A1 | 1/2012 | Hunnekuhl et al. | | |
| 2018/0170101 A1 * | 6/2018 | Asai | .................... | B60B 33/0002 |

* cited by examiner

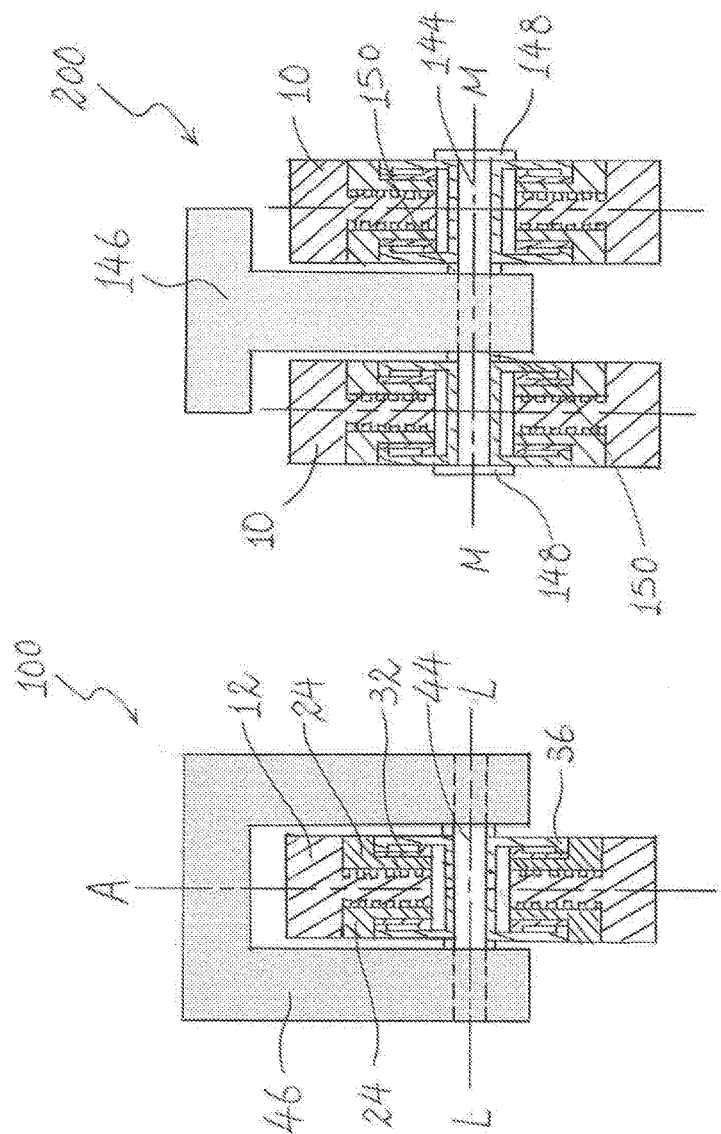

WHEEL MECHANISM

BACKGROUND OF THE INVENTION

This invention relates to a wheel mechanism, in particular a wheel mechanism adapted, but not exclusively, to be attached to such other objects as a luggage trolley, delivery trolley, furniture item or hospital bed.

Such heavy-duty products as luggage trolleys, delivery trolleys, furniture items and hospital beds are installed with wheel mechanisms to facilitate movement.

However, such conventional wheel mechanisms produce much noise during movement, which is (to say the least) annoying to those moving the products.

BRIEF SUMMARY OF THE INVENTION

It is thus an object of the present invention to provide a wheel mechanism and a wheel assembly incorporating at least such a wheel mechanism in which the aforesaid shortcomings are mitigated or at least to provide a useful alternative to the trade and public.

According to a first aspect of the present invention, there is provided a wheel mechanism including an outer wheel, at least one inner wheel received at least in part in said outer wheel, and at least one generally annular damping member between and separating said outer wheel and said inner wheel, wherein said damping member is deformable between a first configuration in which a substantially entire outer periphery of said inner wheel is in contact with an inner wall member of said damping member and a second configuration in which at least a part of said outer periphery of said inner wheel is out of contact with said inner wall member of said damping member, and wherein, in use, said inner wheel is rotatable relative to said damping member.

According to a second aspect of the present invention, there is provided a wheel assembly including at least one wheel mechanism engaged with an attachment member via an axle for rotational movement of said at least one wheel mechanism relative to said attachment member, said wheel mechanism including an outer wheel, at least one inner wheel received at least in part in said outer wheel, and at least one generally annular damping member between and separating said outer wheel and said inner wheel, wherein said damping member is deformable between a first configuration in which a substantially entire outer periphery of said inner wheel is in contact with an inner wall member of said damping member and a second configuration in which at least a part of said outer periphery of said inner wheel is out of contact with said inner wall member of said damping member, and wherein, in use, said inner wheel is rotatable relative to said damping member.

BRIEF DESCRIPTION OF THE SEVERAL VIEWS OF THE DRAWING

Wheel mechanisms according to embodiments of the present invention will now be described, by way of examples only, with reference to the accompany drawings, in which:

FIG. 2 is a sectional view of a wheel assembly according to a first embodiment of the present invention, incorporating the wheel mechanism of FIG. 1;

FIG. 3 is a sectional view of a wheel assembly according to a second embodiment of the present invention, incorporating two wheel mechanisms of FIG. 1.

DETAILED DESCRIPTION OF THE INVENTION

Figure 1:
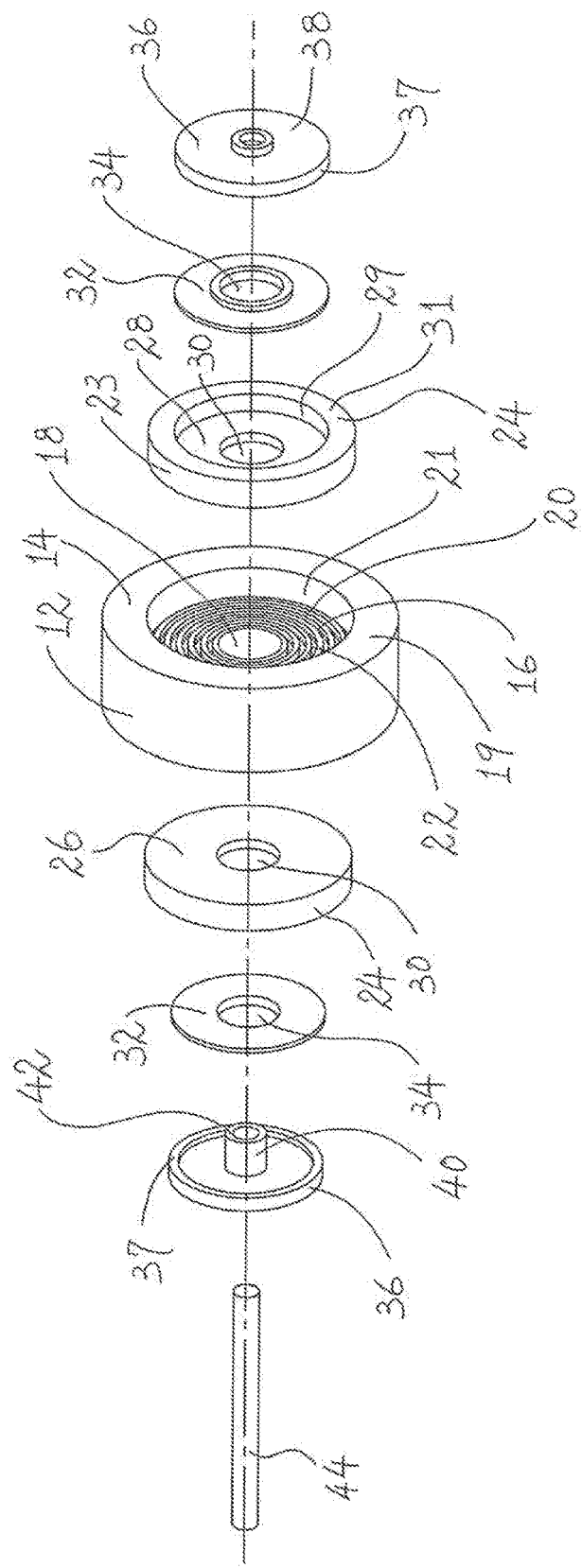
FIG. 1 is an exploded perspective view of a wheel mechanism according to an embodiment of the present invention.

An exploded perspective view of a wheel mechanism according to an embodiment of the present invention is shown in FIG. 1, and generally designated as 10. The wheel mechanism 10 includes a circular outer wheel 12, which includes an outer ring 14 fixedly joined with a central circular disc 16. The outer wheel 12 is made of hard rubber double-injected to and thus joined with the central circular disc 16 (which is made of acrylonitrile butadiene styrene (ABS)), having a central circular hole 18. The outer ring 14 is thus made of hard rubber. Two circular recesses 20 are formed on either side of the central circular disc 16. On each of two major surfaces 22 of the central circular disc 16 are formed a number of concentric grooves or at least one spiraling groove.

On each side of the outer wheel 12 is provided with an annular rubber damper 24. The rubber damper 24 is made of a rubber, e.g. silicone. Each rubber damper 24 includes a planar longitudinal end 26 and an opposite end with a circular recess 28. The rubber damper 24 has an outer diameter which is the same as the inner diameter of the circular recess 20 of the outer wheel 12, so that the rubber damper 24, when the wheel mechanism 10 is duly assembled, is received within the circular recess 20 of the outer wheel 12 such that the entire outer periphery 23 of the outer damper 24 is in contact with the entire inner wall 21 of the recess 20 of the outer wheel 12. The thickness of the rubber damper 24 is the same as the depth of the recess 20 of the outer wheel 12, such that the rubber damper 24 is fully received within the recess 20 of the outer wheel 12. Each of the rubber dampers 24 has a central circular hole 30 which is of the same diameter as the central circular hole 18 of the central circular disc 16 of the outer wheel 12. When the rubber dampers 24 are received within the respective recess 20 of the outer wheel 12, the central holes 30 of the rubber dampers 24 are aligned with the central circular hole 18 of the outer wheel 12.

Next to each rubber damper 24 and on an opposite side to the outer wheel 12 is a respective circular slider washer 32, which is made of plastic (e.g. acrylonitrile butadiene styrene (ABS) or polyurethane) or a metal (e.g. copper or steel). The outer diameter of the slider washer 32 is the same as the inner diameter of the circular recess 28 of the rubber damper 24, so that the slider washer 32 is fully received within a respective recess of the circular recesses 28 of the rubber damper 24. Each of the slider washers 32 has a central circular hole 34 which is of the same diameter as the central circular hole 18 of the outer wheel 12. When the rubber slider washers 32 are received within the respective circular recess 28 of the rubber damper 24, the central holes 34 of the slider washers 32 and the central holes 30 of the rubber dampers 24 are aligned with the central circular hole 18 of the outer wheel 12.

Next to each slider washer 32 and on an opposite side of the rubber damper 24 is a circular inner wheel 36 which is made of a plastic (e.g. acrylonitrile butadiene styrene (ABS)) or a metal (e.g., aluminum) or a metal alloy (e.g., a magnesium alloy). The inner wheel 36 has a generally planar circular disc 38 and a hollow cylindrical member 40 which extends away from the disc 38 towards the outer wheel 12. The outer diameter of the cylindrical members 40 is smaller than the diameter of the central holes 34 of the slider washers 32, that of the central holes 30 of the rubber dampers 24 and that of the central circular hole 18 of the outer wheel 12, such that when assembled, the hollow cylindrical members 40 of the inner wheel 36 extend through the central holes 34 of the slider washers 32, the central holes 30 of the rubber dampers 24 and the central circular hole 18 of the outer wheel 12. The outer diameter of the inner wheel 36 is the same as the inner diameter of the circular recess 28 of the rubber damper 24, so that the slider washer 32 is received within a respective recess of the circular recesses 28 of the rubber damper 24.

In addition, when the wheel mechanism 10 is duly assembled, and as shown in FIG. 2:

(a) the slider washer 32 and the inner wheels 36 are fully received within a respective recess of the circular recesses 28 of the rubber dampers 24;

(b) free ends 42 of the hollow cylindrical members 40 of the two inner wheels 36 abut each other;

(c) each planar disc 38 of each respective inner wheel 36 is co-planar with an annular longitudinal surface 31 of a respective rubber damper 24, which is also co-planar with an annular longitudinal surface 19 of a respective outer wheel 12; and (d) when the wheel mechanism 10 is in an unloaded condition, the entire outer periphery 37 of the planar disc 38 of each inner wheel 36 is in contact with a circular inner wall 29 of the recess 28 of a respective rubber damper 24.

The inner diameter of the hollow cylindrical members 40 is the same as or slightly larger than the outer diameter of an axle 44, so that, when duly assembled, the axle 44 is received within the two hollow cylindrical members 40 which abut and are aligned with each other in an end-to-end manner.

FIG. 2 shows a wheel assembly, generally designated as 100, in which the assembled wheel mechanism 10 is engaged with an attachment member 46 via the axle 44, in which the wheel mechanism 10 may rotate relative to the attachment member 46 about the longitudinal axis L-L of the axle 44. The attachment member 46 may be attached to or be integral with another object, such as a luggage trolley, delivery trolley, furniture item or hospital bed. The installation of the wheel assembly 100 with the wheel mechanism 10 facilitates movement of the object.

It can also be seen in FIG. 2 that the wheel mechanism 10 is symmetrical about an axis A-A which bisects the outer wheel 12 and is perpendicular to the longitudinal axis of the wheel mechanism 10, which coincides with the longitudinal axis L-L of the axle 44 when the axle 44 is received within the wheel mechanism 10.

FIG. 3 shows a second embodiment of a wheel assembly, generally designated as 200, in which two wheel mechanisms 10 are engaged with an attachment member 146 via a single axle 144, such that the wheel mechanisms 10 may rotate relative to the attachment member 146 about the longitudinal axis M-M of the axle 144. The attachment member 146 may be attached to or be integral with another object, such as a luggage trolley, delivery trolley, furniture item or hospital bed. On the outer longitudinal side of each wheel mechanism 10 is an end plate 148, and on the inner longitudinal side of each wheel mechanism 10 is a gap washer 150 which separates the respective wheel mechanism 10 and the attachment member 146.

Figure 4:
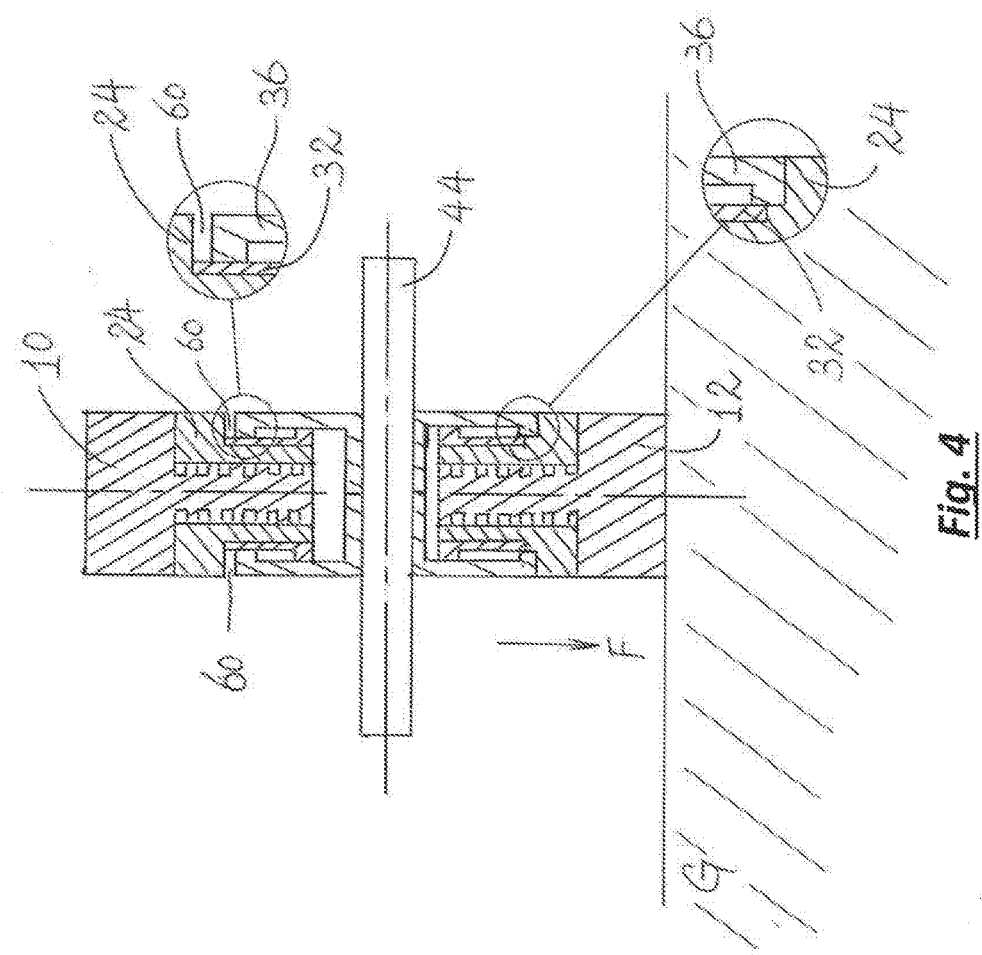
FIG. 4 is a sectional view of the wheel assembly of FIG. 2, when loaded.

Turning now to FIG. 4, such shows the configuration of the wheel mechanism 10 when it is loaded, i.e. when a significant force exerts radially on the rubber damper 24. For example, when the wheel mechanism 10 is engaged indirectly to another object, e.g. a luggage trolley, via the axle 44, the object will bear on the axle 44, which will in turn exert a vertically downward force (indicated by the arrow F in FIG. 4) via the inner wheels 36 to the rubber dampers 24 and the outer wheel 12. Because of the deformability of rubber dampers 24 and the rigidity of the outer wheel 12, the lower parts (i.e. the parts closer to the ground G) of the rubber dampers 24 will be compressed, thus allowing the inner wheels 36 to descend relative to the slider washers 32, and consequently bringing about two gaps 60 between the rubber dampers 24 and the inner wheels 36. The creation of the gaps 60 is also made possible because of the difference between, on the one hand, the outer diameter of the cylindrical members 40 of the inner wheel 36 and, on the other hand, the diameter of the central holes 34 of the slider washers 32, that of the central holes 30 of the rubber dampers 24 and that of the central circular hole 18 of the outer wheel 12.

Put another way, when the wheel mechanism 10 is unloaded, the entire outer periphery 37 of each of the discs 38 of the inner wheels 36 is in contact with the inner wall 29 of the circular recess 28 of a respective rubber damper 24. When the wheel mechanism 10 is loaded in use, due to the deformation of the rubber dampers 24, a part of the outer periphery 37 of each of the discs 38 of the inner wheels 36 is out of contact with the inner wall 29 of the circular recess 28 of a respective rubber damper 24, thus producing the gaps 60 at the upper part (i.e. the part further from the ground G) between the inner wheels 36 and the rubber dampers 24, although it should be understood that, as the wheel mechanism 10 rotates, it is in fact different parts of the outer periphery 37 of the disc 38 of the inner wheel 36 which successively comes out of contact from the inner wall 29 of the circular recess 28 of the rubber dampers 24. It should also be noted that, during rotational movement of the wheel mechanism 10 in use, the inner wheels 36 rotate about the longitudinal axis L-L of the axle 44 relative to the rest of the wheel mechanism 10.

It is found that, by way of the arrangement and structure of the wheel mechanism 10 as discussed above, in particular the deformation of the rubber dampers 24 when loaded, the wheel mechanism 10 produces significantly less noise during operation. In addition, as the rubber dampers 24 separate the inner wheels 36 from the outer wheel 12, transmission of vibration shock from the ground through the outer wheel 12 to the inner wheels 36 during rotation of the wheel mechanism 10 on the ground is reduced. The concentric grooves or at least one spiraling groove on the two opposite major surfaces 22 of the central circular disc 16 of the outer wheel 12 also assist in reducing transmission of vibration shock from the ground through the outer wheel 12 to the inner wheels 36 during rotation of the wheel mechanism 10 on the ground.

It should be understood that the above only illustrates examples whereby the present invention may be carried out, and that various modifications and/or alterations may be made thereto without departing from the spirit and scope of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A wheel mechanism including: an outer wheel, at least one inner wheel received at least in part in said outer wheel, and at least one generally annular damping member between and separating said outer wheel and said inner wheel, wherein said damping member is deformable between a first configuration in which a substantially entire outer periphery of said inner wheel is in contact with an inner wall member of said damping member and a second configuration in which at least a part of said outer periphery of said inner wheel is out of contact with said inner wall member of said damping member, and wherein, in use, said inner wheel is rotatable relative to said damping member.

2. A wheel mechanism according to claim 1, wherein said damping member is movable from said first configuration to said second configuration upon deformation of said damper upon application of a force thereon in a radial direction.

3. A wheel mechanism according to claim 1 wherein said damping member is received at least in part in said outer wheel.

4. A wheel mechanism according to claim 1, wherein said damping member is made of rubber.

5. A wheel mechanism according to claim 4 wherein said damping member is made of silicone.

6. A wheel mechanism according to claim 1, wherein said outer wheel member is made of hard rubber double-injected to an acrylonitrile butadiene styrene (ABS) member.

7. A wheel mechanism according to claim 1, wherein said inner wheel is made of a plastic, a metal or a metal alloy.

8. A wheel mechanism according to claim 7 wherein said inner wheel is made of acrylonitrile butadiene styrene, aluminum or magnesium alloy.

9. A wheel mechanism according to claim 1, further including at least one washer member, wherein said washer member is between said damping member and said inner wheel.

10. A wheel mechanism according to claim 9 wherein said washer member is made of a plastic or metal.

11. A wheel mechanism according to claim 10 wherein said washer member is made of acrylonitrile butadiene styrene, polyurethane, copper or steel.

12. A wheel mechanism according to claim 1, wherein said outer wheel includes an outer ring member joined with a central circular disc, forming at least one recess for receiving at least part of said inner wheel.

13. A wheel mechanism according to claim 12 wherein said central circular disc includes at least a major surface provided with a plurality of concentric grooves or at least one spiraling groove thereon.

14. A wheel mechanism according to claim 13 wherein a major surface of said damping member is in contact with said major surface of said central circular disc of said outer wheel.

15. A wheel mechanism according to claim 12 including a first and a second inner wheels, a first and a second damping members, and a first and a second washer members, wherein said first inner wheel, first damping member and first washer member are on a first side of said central circular disc of said outer wheel and said second inner wheel, second damping member and second washer member are on an opposite second side of said central circular disc of said outer wheel.

16. A wheel assembly including at least one wheel mechanism according to claim 1 engaged with an attachment member via an axle for rotational movement of said at least one wheel mechanism relative to said attachment member.

17. A wheel assembly according to claim 16, further including a plurality of wheel mechanisms according to claim 1 attached to an attachment member via at least one axle for rotational movement of said plurality of wheel mechanisms relative to said attachment member.

* * * * *